US010521684B2

(12) United States Patent
Ferguson et al.

(10) Patent No.: US 10,521,684 B2
(45) Date of Patent: Dec. 31, 2019

(54) MEDIA VALIDATION PLATFORM

(71) Applicants: David Ferguson, New Albany, OH (US); Alan R. Wolf, Dublin, OH (US)

(72) Inventors: David Ferguson, New Albany, OH (US); Alan R. Wolf, Dublin, OH (US)

(73) Assignee: Game Changer Holdings, LLC, Cleveland, TN (US)

( * ) Notice: Subject to any disclaimer, the term of this patent is extended or adjusted under 35 U.S.C. 154(b) by 199 days.

(21) Appl. No.: 15/422,420

(22) Filed: Feb. 1, 2017

(65) Prior Publication Data

US 2017/0220885 A1  Aug. 3, 2017

Related U.S. Application Data

(60) Provisional application No. 62/289,589, filed on Feb. 1, 2016.

(51) Int. Cl.
*G06K 9/00* (2006.01)
*G06K 9/20* (2006.01)
*G06K 7/14* (2006.01)
*G06K 9/62* (2006.01)

(52) U.S. Cl.
CPC ......... *G06K 9/2054* (2013.01); *G06K 7/1413* (2013.01); *G06K 7/1443* (2013.01); *G06K 9/2018* (2013.01); *G06K 9/6212* (2013.01)

(58) Field of Classification Search
CPC .. G06K 7/1413; G06K 7/1443; G06K 9/2018; G06K 9/2054; G06K 9/6212
See application file for complete search history.

(56) References Cited

U.S. PATENT DOCUMENTS

| | | | |
|---|---|---|---|
| 2007/0051802 A1* | 3/2007 | Barber | G06Q 10/087 235/383 |
| 2014/0099077 A1* | 4/2014 | Douglass | G11B 17/225 386/247 |
| 2017/0030839 A1* | 2/2017 | Matsuda | G01N 21/8806 |

* cited by examiner

*Primary Examiner* — Nirav G Patel
(74) *Attorney, Agent, or Firm* — Lorraine Hernandez; Kegler Brown Hill + Ritter Co. LPA

(57) ABSTRACT

A device comprising a media validation platform for identifying and detecting defects on a media disc is provided. The media validation platform may include: a media transport system including a guide portion including a cushion medium and a drive portion including a belt drive for conveying a media disc along a path of motion through the media validation platform; a slot providing an opening to the media validation platform and a guide to introduce the media disc to the media transport system; a quality control station comprising a light source, a light diffuser, and a camera for measuring an intensity of light from the light source passing through the light diffuser and a media layer of the at least one media disc; and a media identification station comprising a scanner assembly, the scanner assembly adapted to obtain data from a bar code of the at least one media disc.

15 Claims, 13 Drawing Sheets

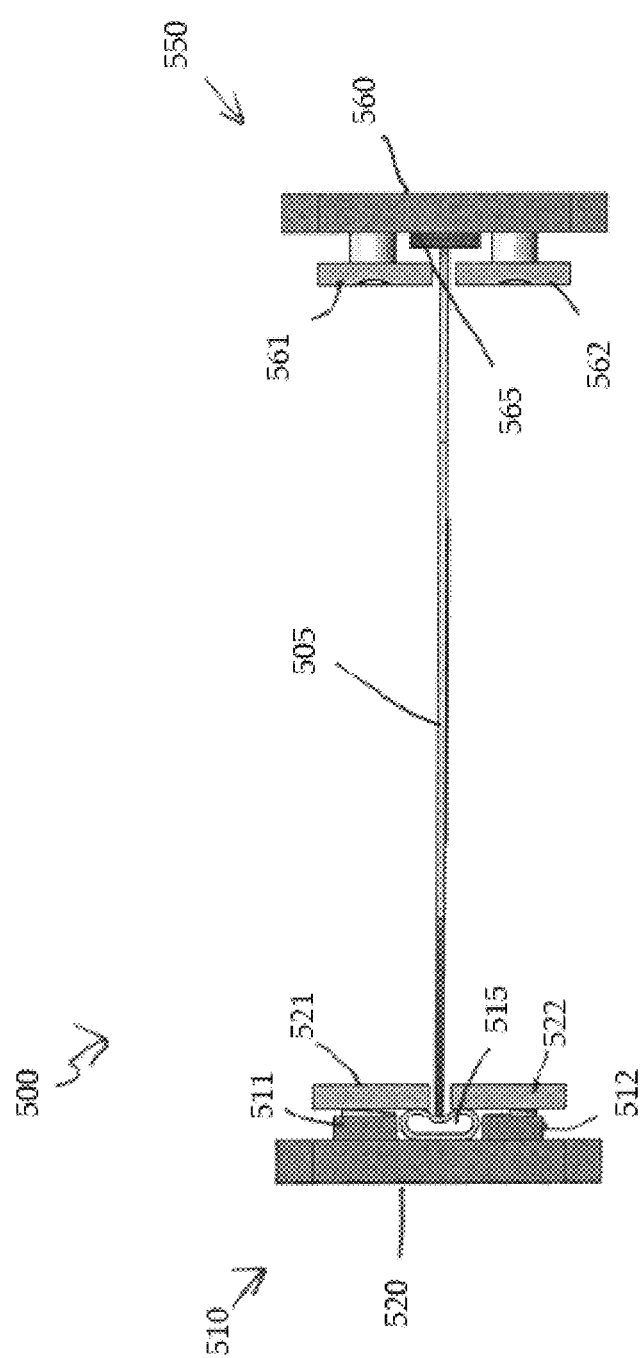

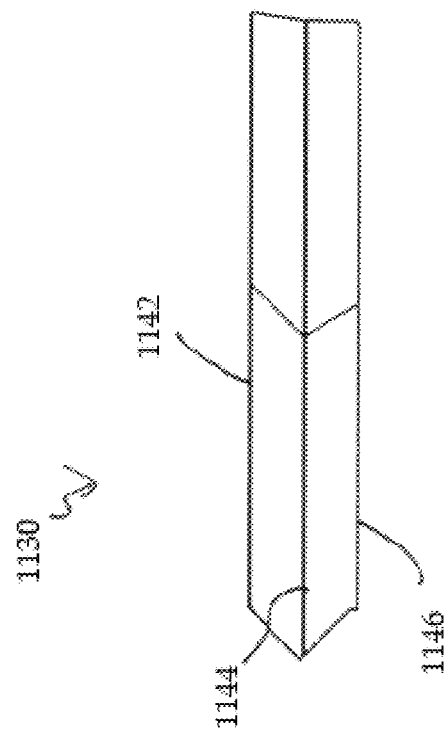
FIG. 12B
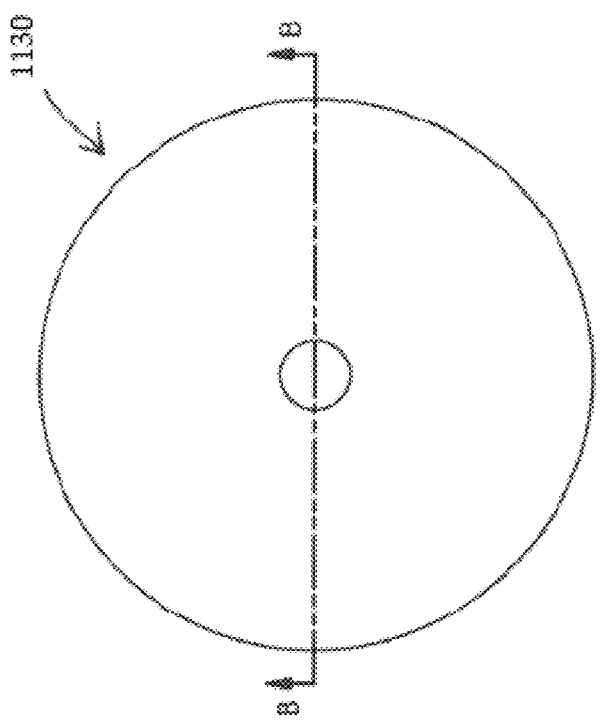
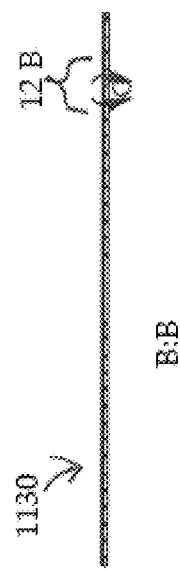
FIG. 12A

MEDIA VALIDATION PLATFORM

This non-provisional application claims the benefit of U.S. provisional application 62/289,589 filed on Feb. 1, 2016, the disclosure of which is incorporated herein by reference.

BACKGROUND AND SUMMARY

This invention relates to media validation platforms, and more specifically to a media validation platform capable of performing quality analysis and media identification of digital storage media.

Automated systems for vending optical storage media, such as CDs and DVDs or Blu-Ray discs, have significantly altered how customers can rent, buy, and sell movies on disc, video games, and more. Such systems may be frequently deployed as kiosks containing a disc inventory, a user interface to allow customers to select discs for rent or sale (or to sell used discs), as well as slots for dispensing discs and receiving discs. Generally it may be desirable that these automated systems be able to properly identify discs as they are processed, catalogued and stored correctly, as well as have an internal or external disc database storage. As well, it may generally be desirable to detect defects on discs being processed by the system so that discs with serious defects can be identified and removed from circulation. As many automated systems are deployed for convenience and high-volume customer use, there is a continuing need to improve the accuracy, speed, and efficiency of such automated systems so that disc media may be processed correctly while minimizing transaction times for customers.

Shortcomings of the prior art are overcome and additional advantages are provided through the provision, of a device, the media validation platform including a media transport system comprising a guide portion and a drive portion, the drive portion adapted to grip a media disc and move the media disc along a path of motion through a media identification station and a quality control station of the media validation platform. The quality control station may include a light source, a light diffuser, and a camera for measuring an intensity of light from the light source passing through the light diffuser and at least a media layer of the media disc and the media identification station may include a scanner assembly adapted to obtain data from a bar code of the at least one media disc.

Additional advantages are provided through a method of performing quality control inspection of a media disc, the method including: obtaining a baseline image of illumination without the media disc; obtaining a disc image of illumination passing through the media disc; separating the disc image numerically by the baseline image to obtain a ratio image; masking one or more portions of the ratio image to produce a masked image, the masked image leaving at least a portion of the ratio image unmasked, the unmasked portion of the ratio image corresponding to a data region of the media disc; reducing the masked image to a histogram image; reducing the histogram image to a plot of intensities of light over the histogram image; and, calculating a probability of pinholes not being present on the media disc based on the plot of intensities of light.

Additional features and advantages are realized through the techniques of the present invention. Other embodiments and aspects of the invention are described in detail herein and are considered a part of the claimed invention.

The media validation platform may comprise a media transport system including a guide portion and a drive portion, the drive portion adapted to grip a media disc and move the media disc along a path of motion through a quality control station and a media identification station of the media validation platform; the quality control station comprising a light source, a light diffuser, and a camera for measuring an intensity of light from the light source passing through the light diffuser and at least a media layer of the media disc; and a media identification station comprising a scanner assembly, the scanner assembly adapted to obtain data from a bar code of the media disc.

The media validation platform may further comprise at least one stop gate configured to move into the path of motion to thereby temporarily halt movement of the media disc through the media validation platform. The stop gate may be pivotally attached to rotate into the path of motion.

The media validation platform further comprises a plurality of stop gates, the plurality of stop gates comprising a first stop gate disposed adjacent to the quality control station and a second stop gate disposed adjacent to the media identification station.

The media validation platform may further comprise a slot for introducing media discs to the media transport system, wherein the media disc is a first media disc, and wherein either of the first stop gate or second stop gate is further disposed between the slot and either the quality control station or the media identification station and is further configured to prevent a second media disc from being fully inserted into the slot while the media transport system moves the first media disc through either or both of the quality control station and the media identification station.

The scanner assembly of the media validation platform may further comprise a camera and a light source, the light source comprising one or more LED light sources, and with the light source surrounding the camera.

The media identification station may further comprises an ID processor, with a camera configured to take an image of at least one barcode region of the media disc and the ID processor is configured to analyze the image and identify barcodes located on the media disc.

The media validation platform may further comprise a connection to the media disc database, where the data obtained from the bar code of the media disc is correlated with data of the media disc database to identify an identity of the media disc.

Also disclosed is an additional embodiment of the media validation platform, wherein the media disc database may be configured to add or modify data of the media disc database in response to receiving information from the media identification station obtained from the bar code of the at least one media disc.

The media identification station may further comprise one or more servo lifting motors operably coupled to the scanner assembly, the one or more servo lifting motors raising the scanner assembly to contact the media disc.

Further disclosed presently is an embodiment of the media validation platform, where the quality control station may be configured to perform a method of detecting defects in a media disc, the method comprising: obtaining a baseline image of illumination without the media disc; obtaining a disc image of illumination passing through the media disc; dividing the disc image numerically by the baseline image to obtain a ratio image; masking one or more portions of the ratio image to produce a masked image, the masked image leaving at least a portion of the ratio image unmasked, the unmasked portion of the ratio image corresponding to a data region of the media disc; reducing the masked image to a histogram image; reducing the histogram image to a plot of intensities of light over the histogram image; and, calculating a probability of defects not being present on the media disc based on the plot of intensities of light.

Further, the media validation platform may have the light diffuser and light source of the quality control station are spaced apart by a gap, the gap facilitating even illumination of the light diffuser by the light source. The light diffuser and light source may be spaced apart by a gap of about 0.83 inches.

Further, the light diffuser may be positioned within the quality control station so that the light diffuser does not contact the media disc when the media disc is positioned within the quality control station. The light diffuser may be positioned to be spaced about 0.06 inches away from the media disc.

Further, the drive portion may comprise a belt drive, the belt drive comprising a belt and a plurality of rotatable drive pulleys for driving the belt. At least one rotatable drive pulley may be adjustably positioned by the drive portion into at least a first position and a second position, wherein when the at least one rotatable drive pulley is in the first position the belt drive does not contact the media disc, and when the at least one rotatable drive pulley is in the second position the drive belt contacts the media disc thereby allowing the drive portion to grip the media disc.

Further, the quality control station may be further configured to take a top side image of the media art layer, and used to facilitate validating an identity of the media.

Also disclosed is a method of detecting defects in a media disc, the method comprising obtaining a baseline image of illumination without the media disc; obtaining a disc image of illumination passing through the media disc; separating the disc image numerically by the baseline image to obtain a ratio image; obtaining a plot of intensities of light based on the ratio image; and, calculating a probability of defects not being present on the media disc based on the plot of intensities of light.

Also disclosed is the method of detecting defects in a media disc, where obtaining the plot of intensities of light further comprises: masking one or more portions of the ratio image to produce a masked image, the masked image leaving at least a portion of the ratio image unmasked, the unmasked portion of the ratio image corresponding to a data region of the media disc; reducing the masked image to a histogram image; and reducing the histogram image to the plot of intensities of light over the histogram image.

Also disclosed is an optical disc identification system comprising: a disc transport system adapted to support a prerecorded media disc to expose a read side of the media disc, a light source positioned to illuminate a majority of the read side of the media disc in the disc holder, a sensor capable of capturing a digital image of at least a portion of the read side of the media disc, an image processor capable of reading at least one bar code from the digital image, and a motor which is capable of moving an exterior tube into contact with the media disc.

In an additional embodiment, the optical disc identification system of claim further comprises an interior tube located within the exterior tube, where the interior tube is at least partially covered in a non-reflective material.

BRIEF DESCRIPTION OF THE DRAWINGS

One or more aspects of the present invention may be more fully illustrated and explained with reference to the accompanying drawings in which:

FIG. 5 depicts a cut-away view of a portion of an embodiment of a media transport system of a media validation platform, in accordance with one or more aspects of the present invention;

FIGS. 12A and 12B depict a media disc, in accordance with one or more aspects of the present invention.

DETAILED DESCRIPTION OF THE DRAWINGS

Aspects of the present invention and certain features, advantages, and details thereof, are explained more fully below with reference to the non-limiting examples illustrated in the accompanying drawings. Descriptions of well-known materials, fabrication tools, and processing techniques are omitted so as not to unnecessarily obscure description of the invention. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Reference is made below to the drawings, which are not drawn to scale for ease of understanding, wherein the same reference numbers used throughout different figures designate the same or similar components.

Figure 1:
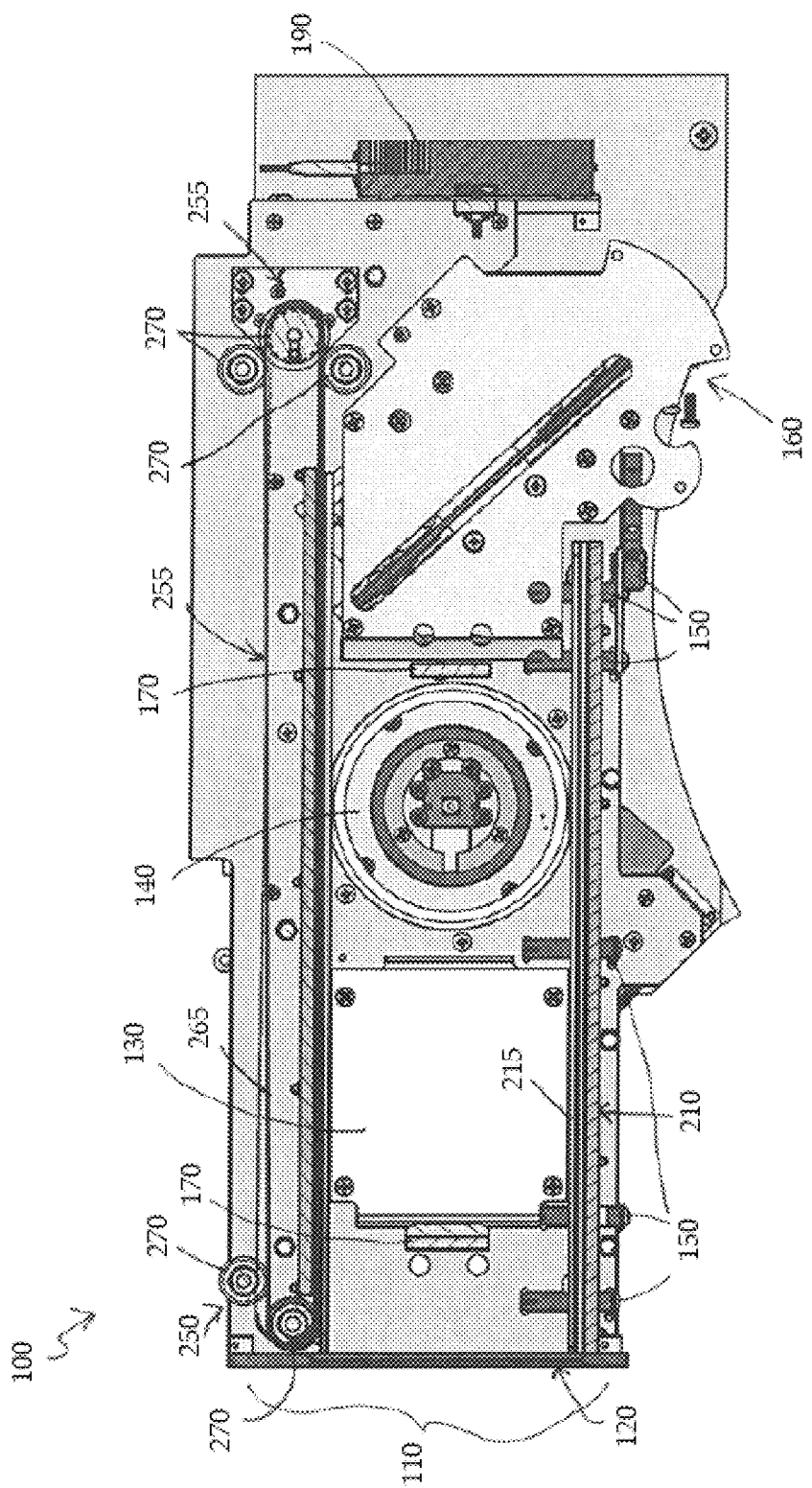
FIG. 1 depicts a top-down view of an embodiment of a portion of a media validation platform, in accordance with one or more aspects of the present invention.
Figure 2A:
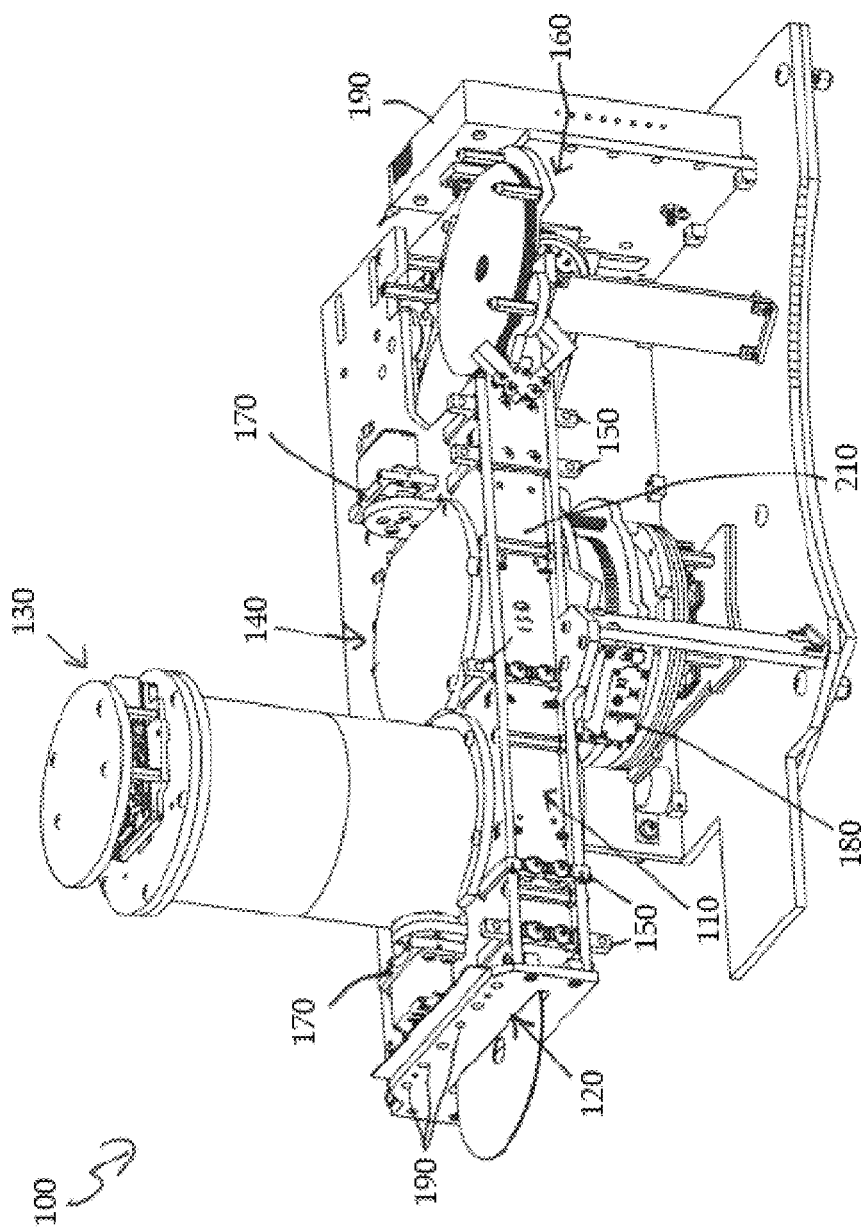
FIGS. 2A and 2B depict anterior and posterior three-dimensional perspective views of an embodiment of a media validation platform, in accordance with one or more aspects of the present invention.
Figure 2B:
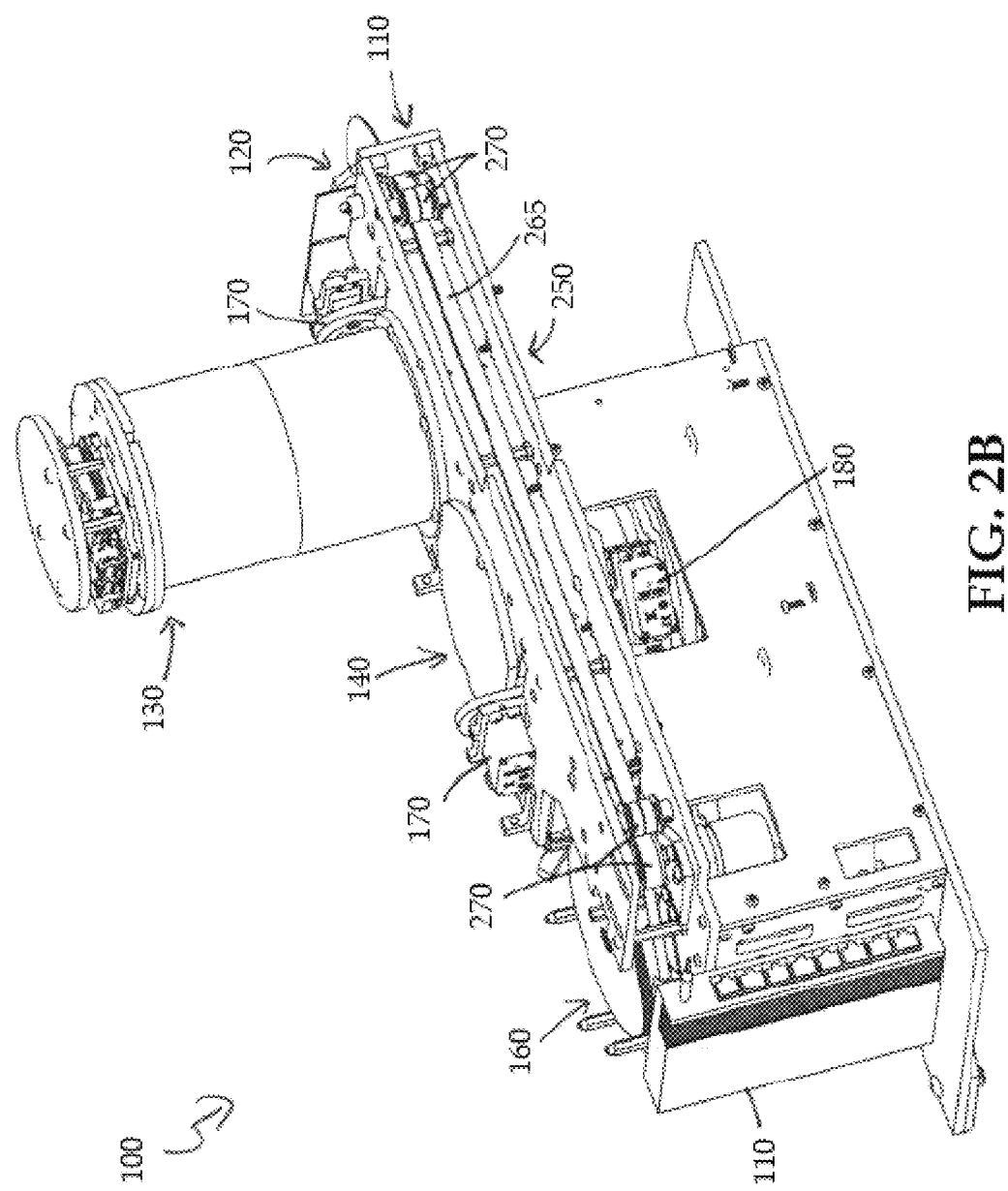

FIGS. 1, 2A and 2B illustrate one embodiment of a media validation platform 100; FIG. 1 presents a top-down view of a portion of the media validation platform 100, and FIGS. 2A and 2B present two three-dimensional perspective views of the media validation platform 100. Generally, the media validation platform 100 includes a media transport system 110, a slot 120 that provides an opening to the media validation platform to introduce media discs to the media transport system, a quality control station 130, and a media identification station 140. The media validation platform may, in exemplary embodiments, further include one or more media location sensors 150, a media collection station 160, at least one stop gate 170 (including, for example, a forward stop gate and a rear stop gate), one or more lifting servos 180 coupled with the media identification station 140, and a plurality of sequenced lights 190 disposed by the slot to guide user interaction with the media validation platform 100. These elements are described below in further detail and depicted, at least in part, in FIGS. 1-12B.

The media transport system 110 may include a guide portion 210 and a drive portion 250. The guide portion may include a cushion medium 215, (as seen in further detail in FIG. 5) and the drive portion may include a belt drive 255, as illustrated in FIG. 1. The belt drive 255 of drive portion 250 may be adapted to grip an edge of a media disc, introduced via the slot 120, and the cushion medium 215 may be adapted to engage an opposing edge of the media disc. The belt drive 255 may be further configured to move the media disc along a path of motion through quality control station 130 and media identification station 140 of the media validation platform 100. As further illustrated by FIGS. 3 and 4, the belt drive may include a belt 265, such as a rubber belt, and a plurality of rotatable drive pulleys 270 for driving the belt 265. As the belt drive 255 grips an edge of a media disc, the rotatable drive pulleys 270 drive the belt 265 and pull or push the disc along the path of motion through the media validation platform 100. The cushion medium 215 (as seen in further detail in FIG. 5) may be compressed as the belt drive 255 grips the one edge of the media disc, allowing the cushion medium 215 to engage an opposing edge of the media disc. Thus, a media disc gripped by the belt drive 255 rotates as the belt drive 255 moves, and the cushion medium 215 provides a non-moving cushion for the media disc to rotate against so that the media disc may move along the path of motion within the media validation platform 100.

The media transport system 110 moves a media disc along the path of motion to a quality control station 130 and a media identification station 140. The quality control station 130, described in further detail below, tests a media disc for the presence of defects in a reflective or media layer of a media disc. As such defects may affect continued usability of a media disc, it may be important to identify discs with defects so that a substantially damaged disc may be removed from circulation or refused to be purchased from a seller. The media identification station 140, also described in further detail below, scans a barcode layer of a media disc for coded data that may identify the disc and the disc's contents, such as a media title, copyright and trademark information, unique disc identifier information, and so on. The media transport system 110 may be configured to stop when a media disc is positioned within the quality control station 130 so that the stationary disc may be scanned for quality control, including detection of defects, and may be configured to stop again when a disc is positioned within the media identification station 140 so that a bar code layer or region may be scanned. As further illustrated in FIG. 3, the media transport system 110 may be configured to allow multiple media discs to be processed by the media validation platform at once. For example one disc may be in process at the identification station or the quality checking station while other disks are at the collection platform. Thus, it may be understood that references to "a disc" or "a media disc" herein throughout may be equally applicable to a plurality of discs or media discs. In some embodiments, as illustrated in certain figures, the media transport system 110 has a guide portion 210 on the right side of the slot 120 (as viewed looking into the slot) and a drive portion 250 on the left side of the slot 120, but it may be understood that the guide portion and drive portion may have switched positions relative to the slot 120 in alternative embodiments.

Figure 3:
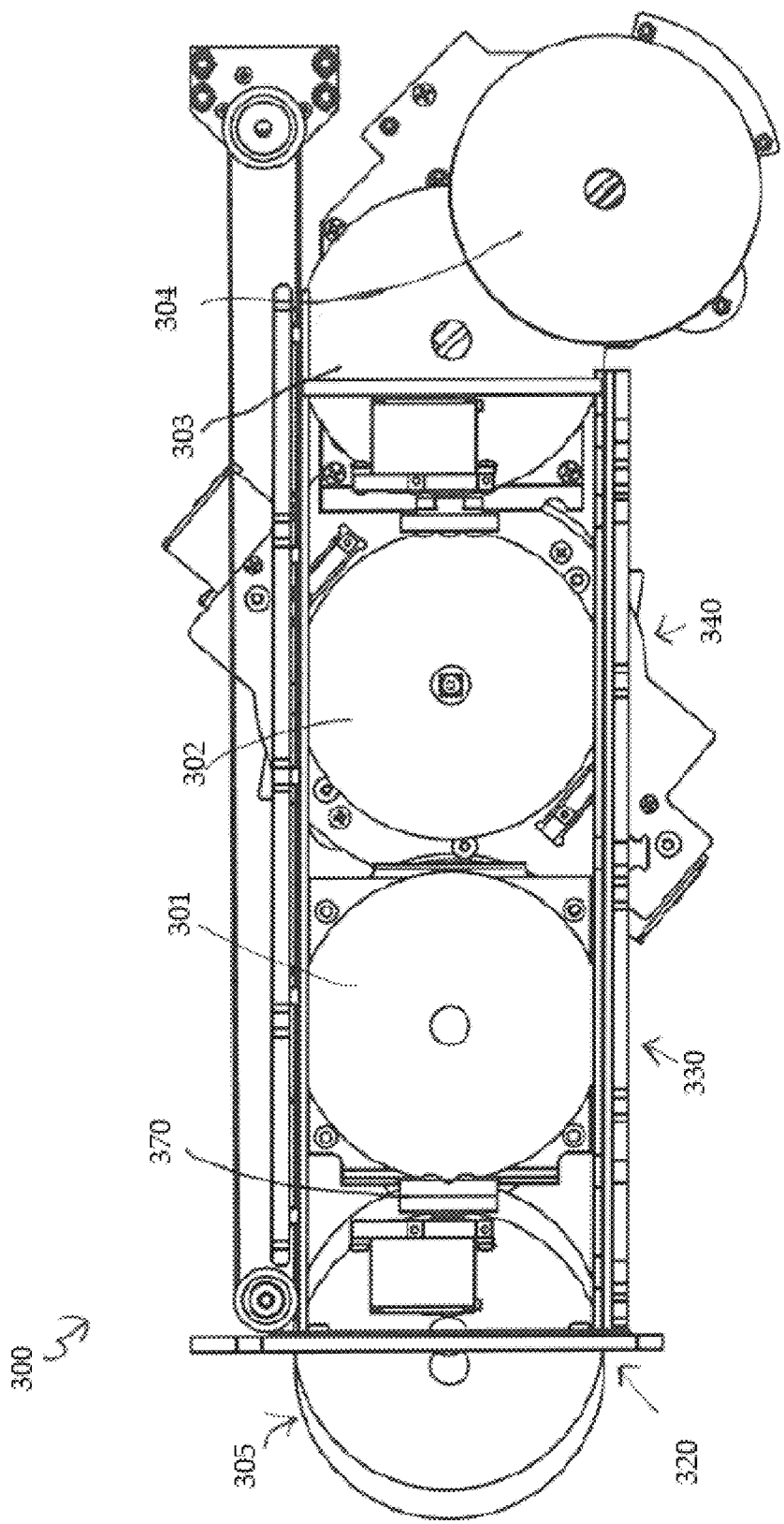
FIG. 3 depicts an embodiment of the media validation platform of FIGS. 1 and 2 with media discs shown at various locations of the media validation platform as the media discs are conveyed along a media transport system of the media validation platform, in accordance with one or more aspects of the present invention.

The media validation platform 100 may also include one or more media location sensors 150, as also shown in further detail in FIG. 3. Media location sensors may be disposed at various points along the path of motion of the media transport system 110 to allow the media validation platform 100 to detect media discs as they are conveyed along the path of motion. The one or more media location sensors 150 may facilitate tracking a location of the media disc within the media validation platform 100. The one or more media location sensors 150 may, for example, be interruptible sensors that may sense the presence of a media disc, for example, as the media disc "interrupts" a light beam between two portions of the interruptible sensor. In exemplary embodiments, the media location sensors 150 may be placed on the same side of the media transport system 110 as the guide portion 210 so that the drive portion does not interfere with the media location sensors 150 and vice versa; alternative embodiments in which one or more media location sensors 150 are placed on the drive portion 250 may also be possible. FIG. 3 illustrates one exemplary embodiment in which six media location sensors 350 are deployed along the guide portion 310 of the media transport system, although fewer or more media location sensors may be included in alternative embodiments.

The media validation platform may further include a media disc collection station. The media disc collection station may include, in exemplary embodiments, a collection platform, one or more alignment stops, and a transport mechanism to convey media discs away from the path of motion of the media transport system and onto the collection platform. The media disc collection station may be configured to collect one more media discs after the media discs have been processed through the quality control station and the media identification station. The media disc collection station, as further illustrated in FIGS. 10 and 11, may be configured, as further described below, to allow for collection of multiple discs during a single user's transaction, and subsequently allow another device or apparatus, such as a robotic arm, to convey the multiple discs from the media validation platform to a storage system.

The media validation platform 100 may further include at least one stop gate 170 pivotally attached to a motor. The at least one stop gate 170 may be configured to rotate into the path of motion to temporarily halt movement of an at least one media disc through the media validation platform 100. As illustrated in the exemplary embodiments of FIG. 1 and FIGS. 2A-2B, a media validation platform 100 may include a plurality of stop gates 170, such as a first stop gate 170 disposed adjacent to the quality control station 130 and a second stop gate 170 disposed adjacent to the media identification station 140. The first stop gate 170 adjacent to the quality control station 130 may be termed a "forward stop gate" and the second stop gate 170 adjacent to the media identification station 140 may be termed a "rear stop gate," according to the positions of the stop gates 170 relative to the slot 120. Any stop gate 170 may be configured to rotate into the path of motion when a media disc reaches a particular spot along the path of motion of the media transport system 110, in response to a media disc interrupting a media location sensor 150 or passing a media location sensor 150, or in response to other occurrences that may trigger a stop gate 170, such as if a user attempts to insert new discs into the slot 120 at a time when the media validation platform 100 is not ready to accept additional media discs.

As illustrated in FIGS. 2A and 2B, a front or forward stop gate 170 may be disposed adjacent to the quality control system 130, and may be disposed between the quality control station 130 and the slot 120. In alternative embodiments, in which the positions of the quality control system 130 and media identification system 140 are switched, the forward stop gate 170 may be disposed between the slot and the media identification station. In exemplary embodiments, the media transport system 110 may be configured to allow insertion of a media disc into the slot 120 and drive the media disc forward along the path of motion using the drive portion 250 until the disc has passed a specified point, such as a specified media location sensor 150, and subsequently rotate the forward stop gate 170 into the path of motion. The drive portion 250 may then reverse direction, driving the already inserted media disc back into the forward stop gate 170 to position the media disc within the quality control station 130. The forward stop gate 170 may further prevent additional discs from being inserted fully into the slot 120 while the already inserted media disc is processed by the quality control station 130.

As also illustrated in FIGS. 2A and 2B, a back or rear stop gate 170 may be disposed adjacent to the media identification station 140. In alternative embodiments, in which the positions of the quality control system 130 and media identification system 140 are switched, the rear stop gate 170 may be disposed adjacent to the quality control station 130. In exemplary embodiments, the rear stop gate 170 may be configured to rotate into the path of motion when an inserted media disc has passed a specified point, such as a specified media location sensor 150, to position the media disc within the media identification station 140. The rear stop gate 170 and forward stop gate 170 may, in some embodiments, be configured to synchronously rotate into the path of motion as an inserted media disc is conveyed along the path of motion of the media transport system 110. The media transport system 110 may be configured to drive a media disc forward until it passes a specified media location sensor 150, which may then trigger the forward and rear stop gates 170 rotating into the path of motion so that the media disc is stopped at the rear stop gate 170. The direction of the drive portion 250 may be reversed with the forward and rear stop gates 170 still in place in the path of motion, allowing the disc to be conveyed back into the forward gate 170 and positioned within the quality control station 130 for quality control processing, and then conveyed again forward into the rear stop gate 170 for processing by the media identification station 140. During processing of the media disc within the media validation platform 110, then, the forward stop gate 170 may remain in the path of motion and prevent insertion of additional discs until a processing step, such as media identification, is completed and the forward gate 170 is rotated out of the path of motion, permitting another disc to be inserted in the slot 120 and processed.

During the processing of the media disc in some embodiments, the disc may not rotate around the center plastic hub. The disc may be stationary during processing in the media identification station and the quality control station. Further, the disc transport system may not necessarily insert an apparatus into the center hole of the media disc, and instead may roll the media disc for transport and motion of the media disc.

As also illustrated by FIG. 2A and FIG. 2B, the media validation platform 100 may, in exemplary embodiments, be coupled with or include a network connection, such as an ethernet connection, provided by, for example, a network switch 195. A network connection may permit the media validation platform 100 to communicate with an external server to send and/or receive media disc information, as well as to permit other functions via a network connection. The media validation platform 100 may also include, in exemplary embodiments, a power supply 155, a power distribution unit 175, and a motion control processor 185.

FIG. 3 depicts a top-down view of one embodiment of a media validation platform 300, similar to the media validation platform 100 illustrated in FIGS. 1-2B. FIG. 3 depicts media 301-305 at different positions within the media validation platform 300, demonstrating one example of an embodiment in which multiple media discs 301-305 may be processed and collected by the media validation platform 300 during a single transaction with a user. A first disc 301 is positioned within the quality control station 330, while a second disc 302 is positioned within the media validation station 340. A third disc 303 and a fourth disc 304 are positioned in the media disc collection station 360, where the third disc 303 is ready to be conveyed out of the media transport system for collection and the fourth disc 304 is already positioned for collection on the media disc collection station 360. A fifth disc 305 is shown partially inserted into the slot 320. If the media validation platform cannot accept the disc 305, for example if the platform is currently processing another disc in the media identification station or the quality control station, a stop gate such as a forward stop gate (not shown in FIG. 3) may be moved or rotated into the path of motion to prevent full insertion of the disc 305.

Figure 4B:
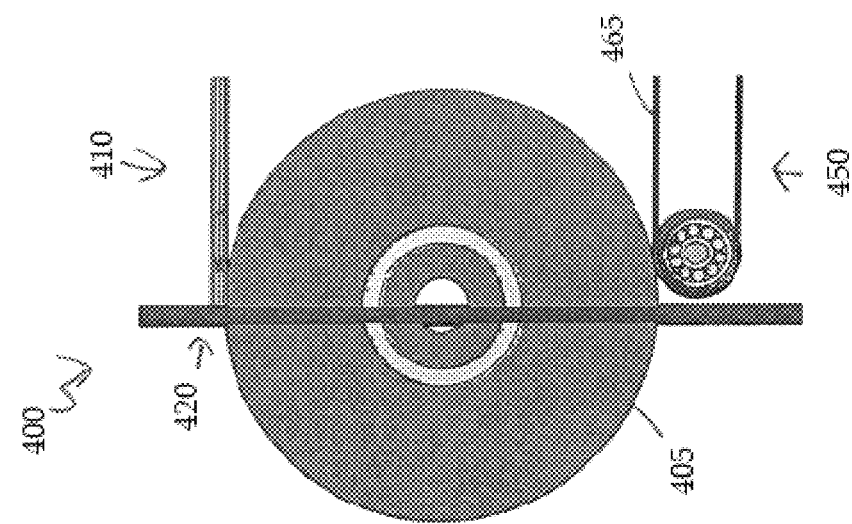
FIGS. 4A and 4B depict an embodiment of a portion of the media validation platform of FIGS. 1-3 to illustrate, at least in part, interaction of a media disc with the media transport system, in accordance with one or more aspects of the present invention.
Figure 4A:
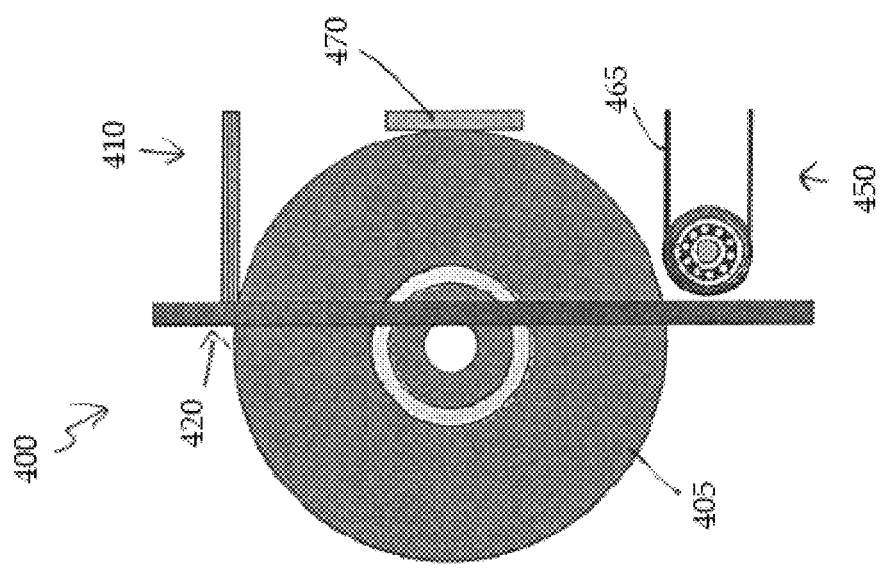

FIGS. 4A and 4B illustrate further details of one embodiment of a portion of a media transport system 400 and slot 420. FIG. 4A shows a media disc 405 partially inserted into the slot 420 in which the forward stop gate 470 is rotated into the path of motion and the drive portion 450 drive belt 465 is not positioned to grip an edge of the inserted media disc 405. At least one of the rotatable drive pulleys is positioned by the drive portion 450 into a first position, as shown in FIG. 4A, so that belt drive 465 does not contact the media disc 405. With the forward stop gate 470 blocking the disc 405 and the drive belt 465 not engaged with the media disc 405, a user cannot mistakenly force a disc into the media validation platform 400 before the media validation platform 400 is ready to accept a disc. FIG. 4B shows the media disc 405 inserted into the slot 420 with the forward stop gate no longer rotated into the path of motion and with the drive portion 450 drive belt positioned to contact the inserted media disc 405, pushing the media disc 405 against the guide portion 410. The at least one rotatable drive pulley may be adjustably positioned by the drive portion 450 into a second position to allow drive belt 465 to contact the media disc, thereby allowing the drive portion 450 to grip the media disc 405. The inserted media disc 405 may, in FIG. 4B, be conveyed by the drive belt 465 forward further into the media validation platform 400.

FIG. 5 depicts a cut-away view of a portion of one embodiment of a media transport system 500 for a media validation platform as depicted in FIGS. 1-4, viewing a media disc 505 edge-on within the media validation platform. The media transport system 500 includes a drive portion 550 and a guide portion 510. The drive portion 450 may include a drive belt 565, as described above and illustrated in FIG. 1 and FIGS. 3-4, and may also include an upper guide rail 561 and lower guide rail 562 coupled to a belt back-wall 560. The spring resistance of the cushion may place a constant force of the media disc 505 against drive belt 565, which may facilitate keeping the media disc 505 in contact with drive belt 565. The drive belt 565 may be in contact with the belt back-wall 560 as illustrated in FIG. 5, and the drive belt 565 being in contact with the belt back-wall 560 may prevent deformation of the shape of the drive belt 565 as a media disc 505 pushes against the drive belt 565, so that the drive belt 565 may sufficiently grip an edge of the media disc 505 and convey the media disc 505 through the media validation platform. The upper and lower guide rails 561, 562, in exemplary embodiments, may be disposed along the belt back-wall 560 to allow a gap between the upper and lower guide rails 561, 562, with the gap being greater than a thickness of a media disc 505. The guide rails 561, 562 may thus normally not be in contact with a media disc 505 as long as the media disc 505 remains within a normal plane of motion, but should the media disc 505 tilt upward or downward as it is conveyed, the upper and/or lower guide rail may counteract the tilting of the media disc 505 and prevent the disc from slipping off the drive belt 565. Similarly, the guide portion 510 may include a cushion medium 515, as described above and illustrated in FIG. 1 and FIGS. 3-4, and may also include an upper cushion containing wall 511 and lower cushion containing wall 512 disposed along a cushion back-wall 520. As with the drive portion 550, the guide portion 520 may also include an upper guide rail 521 and lower guide rail 522, which may prevent a media disc 505 from slipping off the cushion medium 515 if the media disc tips upward or downward out of alignment.

Figure 6:
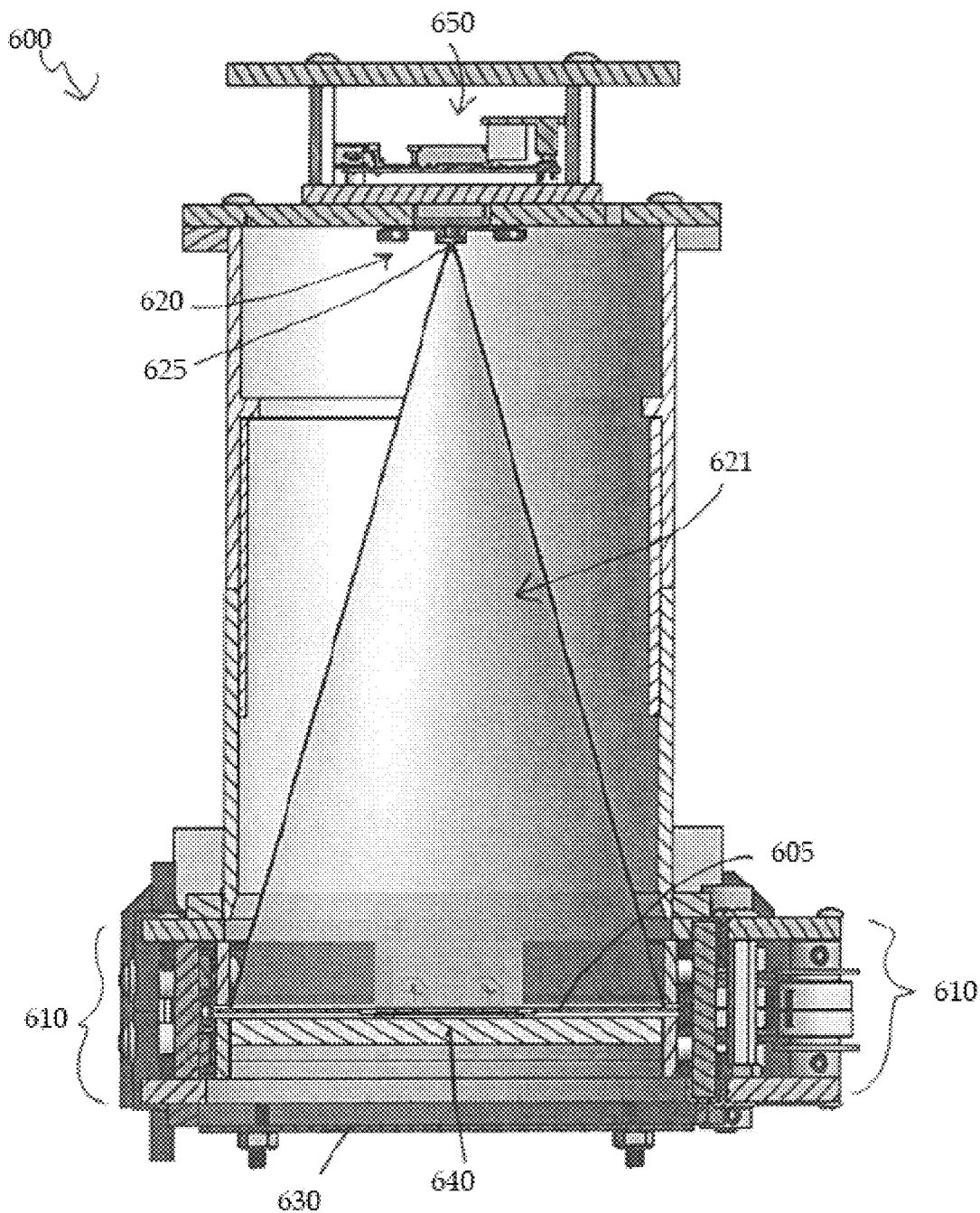
FIG. 6 depicts a cut-away view of one embodiment of a quality control station of the media validation platform of FIGS. 1-3 including a pinhole defect detector, in accordance with one or more aspects of the present invention.

FIG. 6 depicts a cutaway view of one embodiment of a quality control station 600 disposed over a portion of the media transport system 610, shown from a similar perspective as the media transport system 500 in FIG. 5. Paragraphs explain how a quality control station 600 may identify the likelihood of defects in the media disc. The quality control station 600 may include a camera 620 including a camera lens 625, a light source 630, and a light diffusor 640. A quality control station 600 may also include a processor 650, such as the microprocessor 650 illustrated, operatively coupled to the camera 620. The processor 650 may be configured to control operation of the quality control station 600. The media validation platform may be configured to stop motion of a media disc 605 once the media disc 605 is positioned properly within the quality control station 600 so that most of the top surface area of the media disc 605 is within the field of view 621 of the camera 620 and most of the bottom surface area of the media disc 605 may be illuminated by the light source 630 and light diffuser 640. The light source 630 may include a plurality of lights, such as a plurality of LED lights, and the light diffuser 640 may be a translucent medium disposed between the light source 630 and a media disc 605 positioned within the field of view 621 of the camera 620. The light diffuser 640 facilitates scattering and diffusing light from the light source 630 as the light passes through the light diffuser 640 so that the light, on average, illuminates the bottom surface area of the disc 605 evenly without illuminating some portions of the disc 605 more intensely than others. The camera 620 may be configured to image light passing through the light diffuser 640, and light passing through the media disc 605 after passing through the light diffuser 640.

The quality control station 600 may be configured to detect defects, such as "pinhole" defects, in a reflective layer of the media disc 605 (a reflective layer may also be termed a media layer of the media disc). Generally, a media disc 605 includes at least one reflective layer disposed between a bottom surface of the media disc and the top surface of the media disc, and the top surface of the media disc often is a "title" layer, displaying the title of the content of the disc as well as artwork or other images for identifying the disc to a user. The reflective layer of the disc may contain the media data of the disc. In general, if the top title layer of a media disc 605 is intact or has few defects, a reflective layer of the media disc 605 is unlikely to have defects; however, if the top title layer is heavily damaged, a reflective layer of the media disc 605 is also likely to be damaged as well. Damage to a reflective layer may take the form of "pinholes" that permit light to pass through the reflective layer rather than being reflected by the layer. A quality control station 600 may thus be configured to detect the presence of such defects in a reflective layer, and thus determine whether a disc is damaged as well as how extensively a disc is damaged.

The quality control station 600 may first use the camera 620 to image light passed through the light diffuser 640 without a disc present in the quality control station 600, resulting in a baseline image. The baseline image may be further defocused using a blurring algorithm. The baseline image may provide an emulation of the illumination that a completely translucent disc (i.e., a blank disc with no top title layer or reflective layer) would deliver to the camera 620 if such a disc were present in the quality control station 600. The process of producing and defocusing the baseline image also may reduce effects of dust particles and other dark spots that may be present on the light diffuser 640, so that such spots do not produce irregular readings. Once a baseline image is available, a media disc 605 may be positioned in the quality control station 600 and a disc image may be obtained using the camera 620. The disc image may capture light from the light source 630 that passes through the light diffuser 640 and through any pinhole defects or any other defects in the reflective layer of the media disc 605, and through a top title layer of the media disc. The disc image is numerically divided by the baseline image, pixel-by-pixel, to produce a ratio image so that an absolute ratio of light with the media disc 605 present compared to light without the media disc may be determined. The ratio image may then be partially masked, producing a masked image, to block out portions of the image corresponding to non-data portions of the media disc, such as the disc hub and outer edge of the disc, and leave a portion unmasked that corresponds to a data portion of the media disc 605. The masked image may then be reduced to a histogram image, and the histogram image may be further reduced to a list of intensity values across the histogram image. Based on the magnitude of the intensity values, as well as a shape of the plotted intensity levels, a probability of "defects not present" may be calculated. Generally, a probability of around 0.99 indicates that defects such as pinhole defects are likely not present on the scanned media disc, while a probability of around 0.01 indicates it is very likely that defects are present on the scanned media disc. In some embodiments, discs that have been identified as likely or very likely having defects present may be sorted and stored separately from other discs, allowing such discs to be removed from circulation temporarily or permanently. Media discs identified as likely having defects present may be further inspected for damage or otherwise tested for functionality, whether by an automated system or manually.

The light source 630 may be spaced from the light diffuser 640 by a certain distance (about 0.83 inches), allowing the light source 630 to diffuse throughout the light diffuser 640 and illuminate as much of the media disc 605 as possible. The light diffuser 640 may be also spaced a distance (about 0.06 inches) from a media disc 605 positioned within the quality control station 600. Ideally, the light diffuser 640 does not directly contact a media disc 605 in the quality control station 600 to prevent any single point defect in the light diffuser 605 from completely obscuring a portion of the media disc 605. By spacing a media disc 605 above the light diffuser 640, a single point defect may not prevent light from the light diffuser 640 from illuminating a portion of the disc, thus helping to ensure that spots or dust on the light diffuser do not produce irregular images. It will be noted that the approximate values presented here are exemplary values only, and many other values may be possible and are contemplated as being within the scope of this disclosure.

Figure 7:
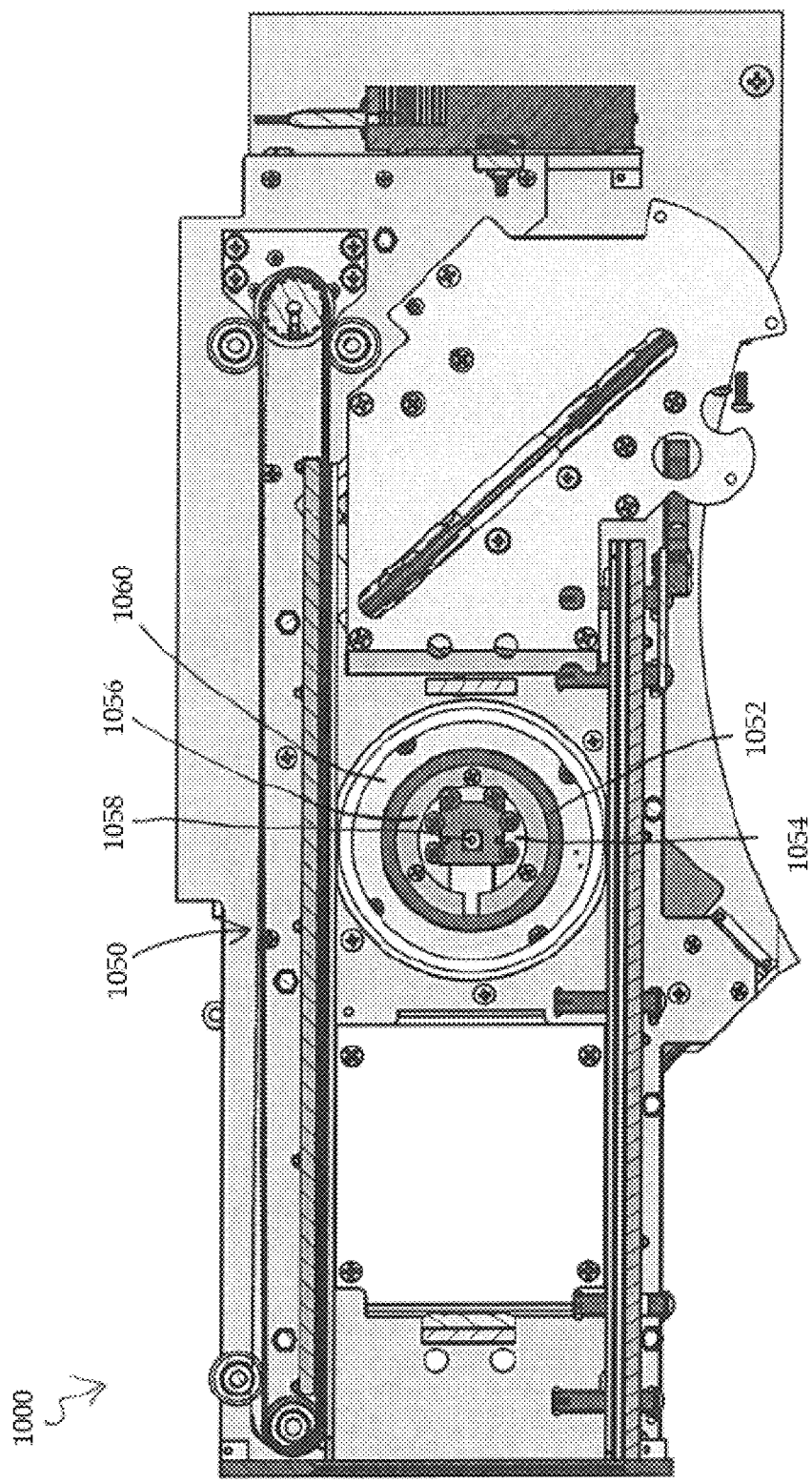
FIG. 7 depicts a top-down view of a media identification station of a media validation platform, in accordance with one or more aspects of the present invention.

FIG. 7 illustrates a top-down view of a media identification station 1050 of a media validation platform 1000. The media identification station 1050 has the means to identify the identity of the media disc, as is described. Included is a camera 1058 located central to the media identification station 1050 within a housing 1054. Further included is a light source 1056 comprising, for example, at least one light emitting diode surrounding the camera 1058 to provide an evenly distributed amount of light. A backplate 1060 and interior tube 1052 are covered with a material which ensures that minimal light is reflected.

Figure 8:
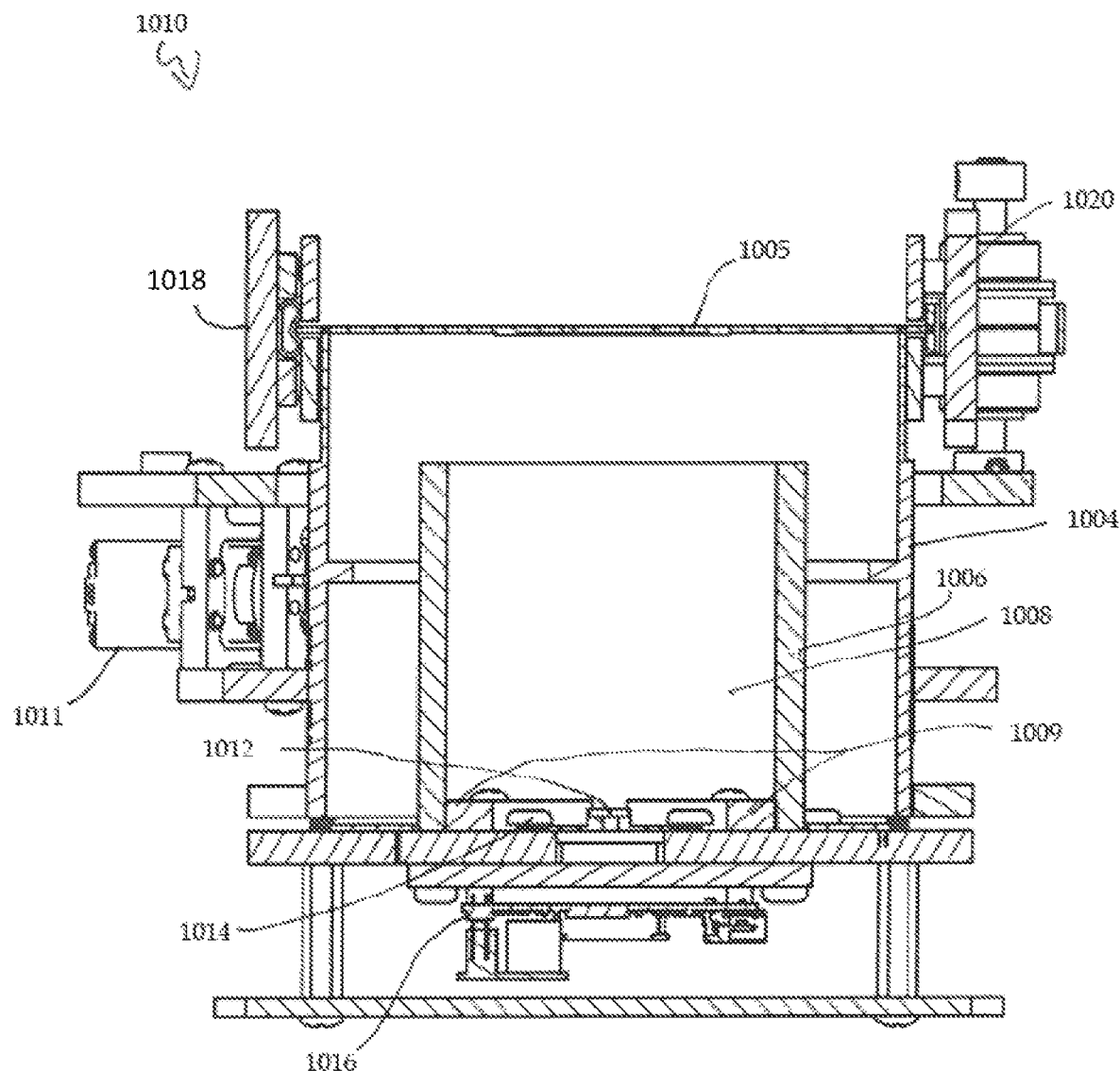
FIG. 8 depicts a cutaway view of an embodiment of a media identification station of the media validation platform including a scanner assembly, in accordance with one or more aspects of the present invention.

FIG. 8 illustrates a media identification station 1010 with a scanner assembly including a sensor 1012 and a light source 1009. The sensor 1012 may be a camera, may be comprised in some embodiments of multiple sensors, and may be held in place by a housing 1014. The light source 1009 may comprise a plurality of LED light sources, and can surround an interior tube 1006. The light source 1009 may emit light across any spectrum, including infrared, visual, or other wavelengths. In some embodiments, the light source 1009 emits substantially white light. In other embodiments, the light source 1009 may emit a wide range of wavelengths or be capable of emitting a specific wavelength. The light source 1009 may be located along any length of the interior tube, or alternatively in proximity to the sensor 1012. The light source may be mounted in some embodiments to an exterior tube 1004 in addition to the interior tube 1006, mounted just to the interior tube 1006, or mounted just to the exterior tube 1004.

Figure 9:
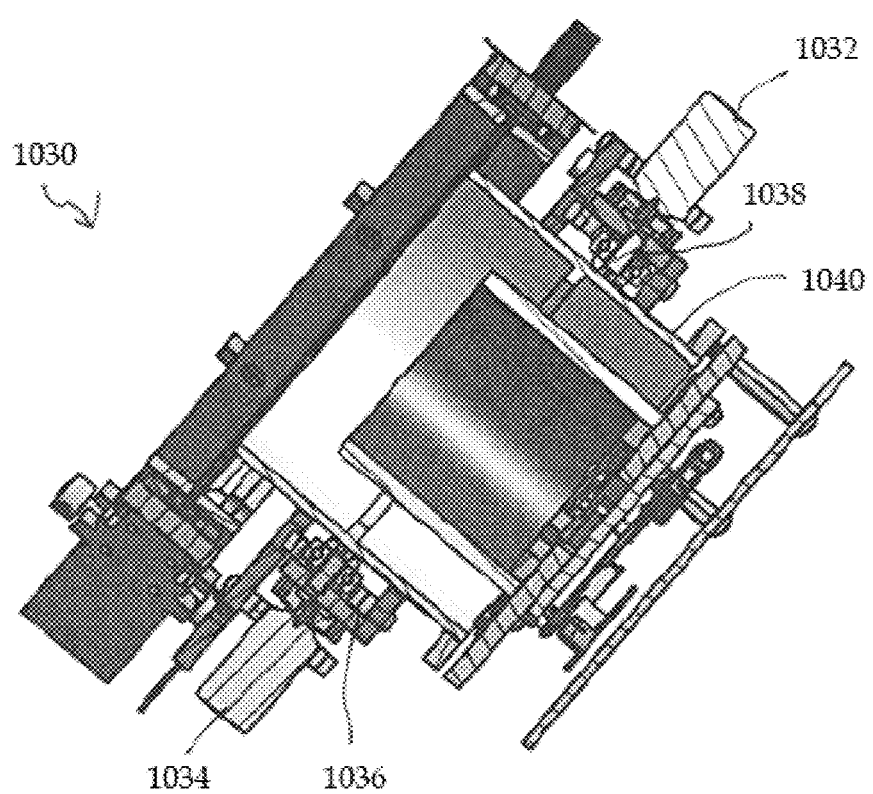
FIG. 9 depicts an isometric cutaway view of a media identification station similar to the media identification station of FIG. 8, in accordance with one or more aspects of the present invention.

The interior tube 1006 may be selectively coated with a non-reflective material, as also shown in FIG. 9, designed to absorb scattered light from the light source 1009. The interior tube 1006 may also be coated with a reflective material capable of scattering light off the coated surface. In some embodiments, the non-reflective material 1008 may be a color which absorbs light, such as a dark material, and may be applied onto the interior tube 1006 by either painting, spraying, anodizing, or any other suitable method. Further, the non-reflective material 1008 may coat an interior surface and/or a top portion of the interior tube, or may coat the entire surface of the interior tube 1006. The reflective material may be applied in a similar manner as the non-reflective material 1008, being applied to an exterior surface, top portion, or entire surface of the interior tube 1006. It is to be appreciated that the various surfaces can be made reflective or non-reflective in any combination in order to achieve desired operational parameters.

An exterior tube 1004 may contain at least the interior tube 1006, sensor 1012, light source 1009, and housing 1014. The exterior tube 1004 has an interior and exterior surface. The interior surface may be coated or lined with a light reflecting material (such as a white surface). The interior surface may also be untreated and not coated or lined, or alternatively comprise a non-reflective surface.

In an exemplary embodiment, light emitted from the light source 1009 reflects against the exterior surface of the interior tube 1006, reflects against the interior surface of the exterior tube 1004, and is absorbed by the top portion and interior surface of the interior tube 1006. In this manner, a media disc 1005 may be evenly illuminated with minimal direct reflection of light back into the sensor 1012 from the media disc 1005 and light source 1009. When the interior surface and top portion of the interior tube 1006 is not highly reflective, the amount of noise the sensor 1012 receives is reduced and enables faster and more accurate identification of the media disc 1005. In some embodiments, the light source 1009 is placed in close proximity to the exterior surface of the interior tube 1006 in order to reduce the amount of light reflected directly into the sensor 1012.

The exterior surface of the exterior tube 1004 may be connected to at least one motor 1010. The exterior tube 1004 may be raised and lowered relative to a media disc 1005 via the at least one motor 1011. The exterior tube 1004 when raised may come into contact with a media disc 1005, reducing or preventing exterior light from bleeding into the interior tube 1006 and sensor 1012. The interior portion of the exterior tube 1004 may be referred to generally as the light chamber. Placing a top portion of the exterior tube into contact with the media disc may ensure that the media disc is at a proper focal distance from the sensor 1012, and also makes the light chamber a more consistent environment. In one embodiment, elements housed within the exterior tube 1004 may be fixed to the exterior tube 1004. In that manner, raising the exterior tube 1004 with the at least one motor 1011 would also raise those components to be closer in proximity to the media disc 1005. Alternatively, one or more components other than the exterior tube 1004 may stay in a fixed position relative to the media 1005 as the exterior tube 1004 is raised.

Further, the top portion of the exterior tube 1004 may be lined with a soft material to prevent damage to the media disc when contact is made. Alternatively, the top portion may be comprised of the same material forming the exterior tube 1004 and lack any buffering material. Further, in some embodiments there may be a contact sensor, although it is not required to achieve the consistent environment within the light chamber. The exterior tube 1004 may contact the media disc 1005 on outer edges of the disc, and within either 1 mm, 2 mm, 3 mm, 4 mm, 5 mm, 10 mm, 20 mm, or some distance from the outer edge of the disc. Alternatively, the exterior tube may make contact with the disc at any distance as measured from the center of the disc, including 1 cm, 2 cm, 3 cm, 4 cm, 5 cm, 5.9 cm, 6 cm, or some other number. Accordingly, the diameter of the exterior tube 1004 may correspond with a doubling of the contact point distance, or may be anywhere from 1 cm to 12 cm or greater, or some other number.

A variation in the location of the media disc 1005 necessarily causes a variation in the location and amount of light reflected off the media disc from the light source and into the sensor. Therefore, a consistent environment may prove advantageous to the task of identifying a media disc by reading a barcode or other information, such as reduced computational complexity in order to identify the barcode location.

The sensor 1012 may take an image of the media disc 1005. There may be located on the media disc 1005 any number of barcode identifiers or other information. The media disc 1005 may be held stationary in a non-rotatable fashion within the media identification station 1010, or alternatively the media disc 1005 may also be in motion. The ID Processor 1016 analyzes an image taken by camera 1012 in order to identify any barcodes located on the media disc 1005. Once a barcode is identified, the ID Processor may then check the barcode against a list of barcodes and their associated disc name or names (i.e., either a game or movie disc; the exact title on the disc). The media identification station 1010 may be configured to identify multiple barcodes on the disc using a single image taken by sensor 1012. This process is assisted by the raising of exterior tube 1004 against the media disc 1005 in order to put the camera at the proper focus distance to the barcodes and block out excess light, and the ring placement of the LED light source 1009. This may provide the sensor 1012 with a consistent, repeatable amount of illumination and makes it easier for the ID Processor 1016 to identify barcodes on the media disc.

FIG. 9 illustrates an isometric cutaway side view of the media identification station 1010 of FIG. 8. The LED lights 109 may be disposed around the scanner assembly including camera 1012 and housing 1006 to evenly illuminate one or more barcode regions of media disc 1005. The sensor 1012 is capable of taking a picture of the media disc, including artwork located on the disc. The media identification station may identify the disc by imaging the artwork and comparing it to a database of artwork images.

Figure 10:
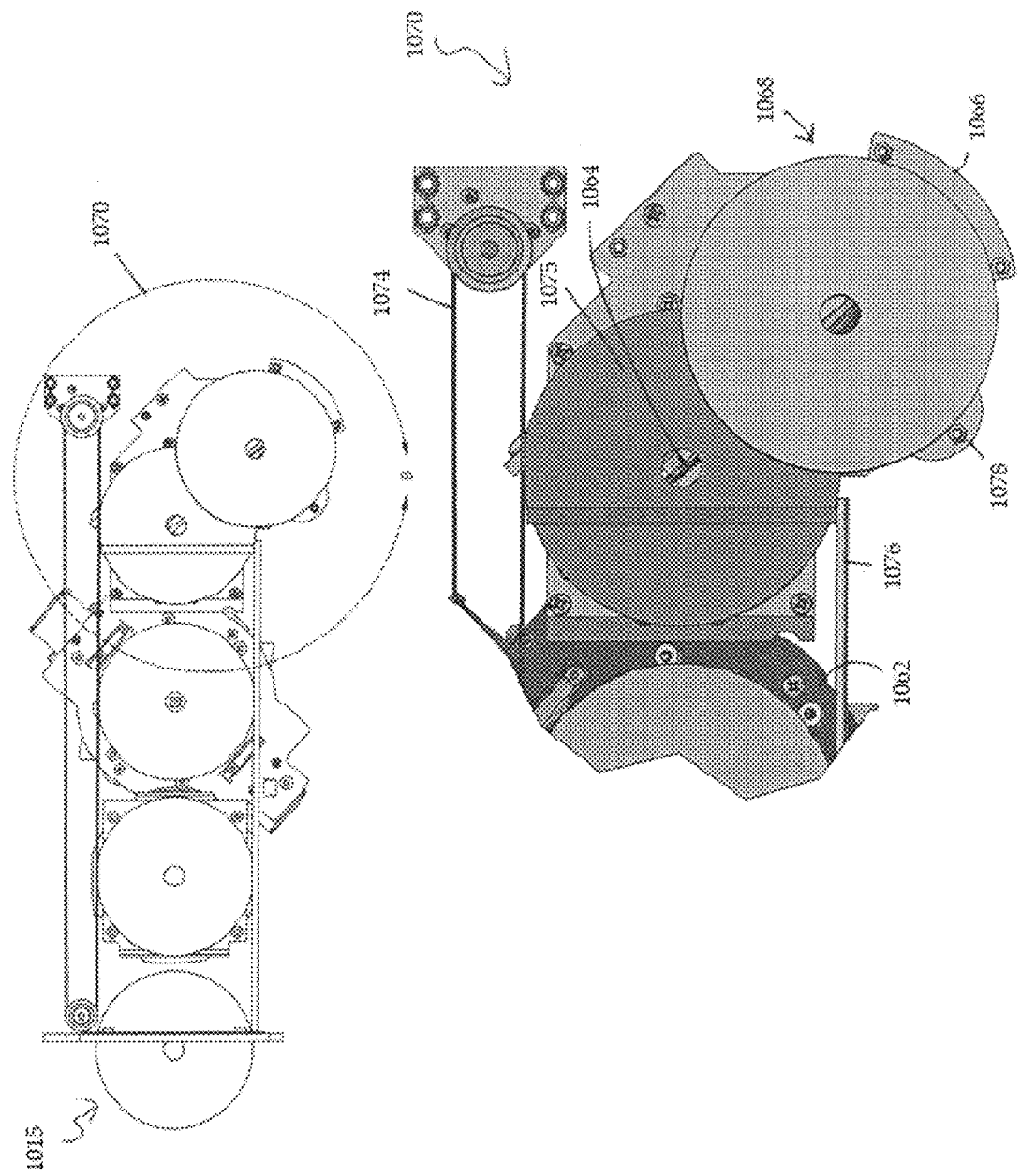
FIG. 10 depicts an embodiment of an end portion of a media validation platform, in accordance with one or more aspects of the present invention.

FIG. 10 depicts a close-up, top-down perspective view of an embodiment of an end portion 1070 of a media transport system 1015 and a disc storage location. A media disc 1075 is driven by a drive belt 1074 to rotate against a fixed cushion medium 1076. At a point within media transport system 1015, the fixed cushion medium 1076 ends and the drive belt 1074 continues to rotate the media disc 1075. In this fashion, a second drive belt 1064 located under the media disc 1075 may begin to transport the media disc 1075 at an angle relative to the previous path of travel of the media disc 1075 within the media transport system 1015. In some embodiments, the second drive belt 1064 may be constructed of a round rubber belt or alternatively a fixed wheel. In other embodiments, the second drive belt 1064 may comprise a plurality of belts.

Figure 11:
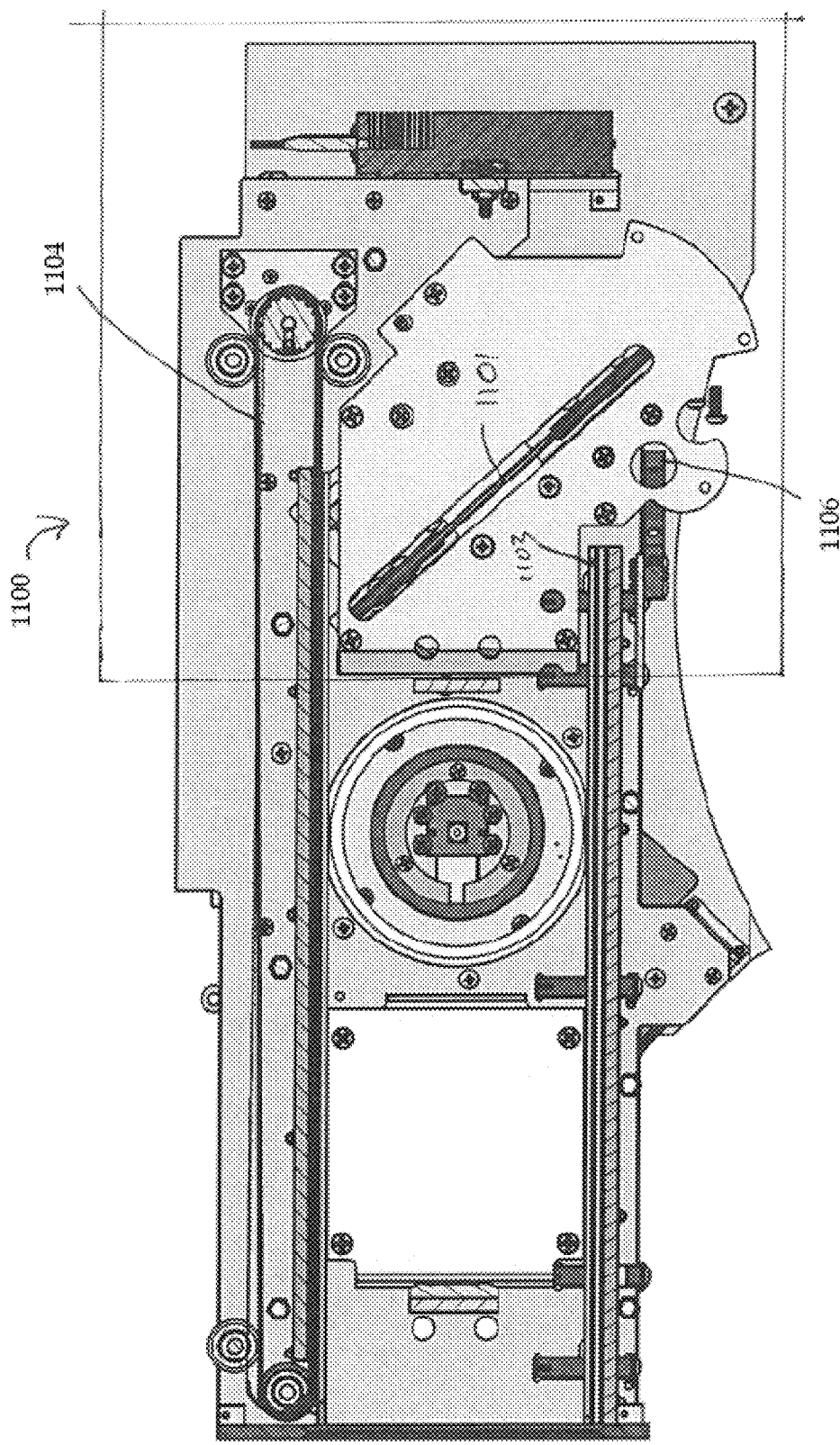
FIG. 11 depicts a side view of an embodiment of an end portion of a media validation platform, in accordance with one or more aspects of the present invention.

FIG. 11 depicts a cutaway side view of one embodiment of an end portion 1100 of a media transport system. The second drive belt 1101 transports a media disc 1105 to a collection station 1115. This transport mechanism in FIG. 11 shows two wheels 1102, 1103 and a round belt 1101 driven by servo. The first wheel 1102 is at a height where the main transport puts the media in contact and media is diverted and pulled in line with the round belt 1101 to the collection station 1115. The second wheel 1103 is higher than the surrounding platform and as the media 1105 is slightly elevated it is driven slightly past the center of the disk to the stops 1116 where it will teeter and raise the rear of the driven disk 1105 to allow the next disc to enter under a stack of discs 1110. The weight of the first and subsequent disks 1110 provide friction for following discs 1105 to be stacked from below. The collection station 1115 may contain stopping structures 1116, which hold the media disc in position for eventual pickup by a robotic arm or other apparatus. Alternatively, the stopping structures 1116 may be omitted from the present invention and permit the media discs to slide past the end portion into a collection bin or other devices for further processing. In some embodiments, the end portion 1100 of the media transport system may be adjacent to a media identification station 1062.

FIG. 12A and FIG. 12B illustrate an embodiment of a media disc 1130. As illustrated by a side cutaway view of the media disc 1130, the media disc may comprises a printed art layer 1142, a reflective layer 1144 containing data, and a transparent protective layer 1146.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have such as "has" and "having"), "include" (and any form of include such as "includes" and "including"), and "contain" (and any form of contain, such as "contains" and "containing") are open-ended linking verbs. As a result, a method or device that "comprises," "has," "includes", or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may and "may be."

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A media validation platform comprising:
   a media transport system including a guide portion and a drive portion, the drive portion adapted to grip a media disc and move the media disc along a path of motion through a quality control station and a media identification station of the media validation platform;
   the quality control station comprising a light source, a light diffuser, and a camera for measuring an intensity of light from the light source passing through the light diffuser and at least a media layer of the media disc;
   a media identification station comprising a scanner assembly, the scanner assembly adapted to obtain data from a bar code of the media disc;
   at least one stop gate pivotally attached to a motor, the at least one stop gate configured to rotate into the path of motion to thereby temporarily halt movement of the media disc through the media validation platform; and
   wherein the at least one stop gate is one stop gate of a plurality of stop gates, the plurality of stop gates comprising a first stop gate disposed adjacent to the quality control station and a second stop gate disposed adjacent to the media identification station.

2. The media validation platform of claim 1, further comprising a slot for introducing media discs to the media transport system, wherein the media disc is a first media disc, and wherein either of the first stop gate or second stop gate is further disposed between the slot and either the quality control station or the media identification station and is further configured to prevent a second media disc from being fully inserted into the slot while the media transport system moves the first media disc through either or both of the quality control station and the media identification station.

3. The media validation platform of claim 1, wherein the scanner assembly comprises a camera and a light source, the light source comprising one or more LED light sources, and wherein the light source surrounds the camera.

4. The media validation platform of claim 3, wherein the media identification station further comprises an ID processor, and wherein the camera is configured to take an image of at least one barcode region of the at least one media disc and the ID processor is configured to analyze the image and identify barcodes located on the media disc.

5. The media validation platform of claim 4, further comprising a connection to a media disc database, and wherein the data obtained from the bar code of the at least one media disc is correlated with data of the media disc database to identify an identity of the at least one media disc.

6. The media validation platform of claim 5, wherein the media disc database is configured to add or modify data of the media disc database in response to receiving information from the media identification station obtained from the bar code of the at least one media disc.

7. The media validation platform of claim 3, wherein the media identification station further comprises one or more servo lifting motors operably coupled to the scanner assembly, the one or more servo lifting motors raising the scanner assembly to contact the media disc.

8. The media validation platform of claim 1, wherein the light diffuser and light source of the quality control station are spaced apart by a gap, the gap facilitating even illumination of the light diffuser by the light source.

9. The media validation platform of claim 8, wherein the light diffuser and light source are spaced apart by a gap of 0.83 inches.

10. The media validation platform of claim 8, wherein the light diffuser is positioned within the quality control station so that the light diffuser does not contact the media disc when the media disc is positioned within the quality control station.

11. The media validation platform of claim 10, wherein the light diffuser is positioned to be spaced 0.06 inches away from the media disc.

12. The media validation platform of claim 1, wherein the drive portion comprises a belt drive, the belt drive comprising a belt and a plurality of rotatable drive pulleys for driving the belt.

13. The media validation platform of claim 12, wherein at least one rotatable drive pulley may be adjustably positioned by the drive portion into at least a first position and a second position, wherein when the at least one rotatable drive pulley is in the first position the belt drive does not contact the media disc, and when the at least one rotatable drive pulley is in the second position the drive belt contacts the media disc thereby allowing the drive portion to grip the media disc.

14. The media validation platform of claim 1, wherein the quality control station is further configured to take a top side image of the media art layer, and wherein the top side image is used to facilitate validating an identity of the media.

15. A media validation platform comprising:
   a media transport system including a guide portion and a drive portion, the drive portion adapted to grip a media disc and move the media disc along a path of motion through a quality control station and a media identification station of the media validation platform;
   the quality control station comprising a light source, a light diffuser, and a camera for measuring an intensity of light from the light source passing through the light diffuser and at least a media layer of the media disc;
   a media identification station comprising a scanner assembly, the scanner assembly adapted to obtain data from a bar code of the media disc;
   wherein the scanner assembly comprises a camera and a light source, the light source comprising one or more LED light sources, and wherein the light source surrounds the camera; and
   wherein the media identification station further comprises one or more servo lifting motors operably coupled to the scanner assembly, the one or more servo lifting motors raising the scanner assembly to contact the media disc.

* * * * *